United States Patent
Michalakis et al.

(10) Patent No.: US 10,133,270 B2
(45) Date of Patent: Nov. 20, 2018

(54) ELECTRONIC CONTROL UNITS, VEHICLES, AND METHODS FOR SWITCHING VEHICLE CONTROL FROM AN AUTONOMOUS DRIVING MODE

(71) Applicant: Toyota Research Institute, Inc., Los Altos, CA (US)

(72) Inventors: Nikolaos Michalakis, Saratoga, CA (US); Stephanie Paepcke, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 15/471,065

(22) Filed: Mar. 28, 2017

(65) Prior Publication Data

US 2018/0284759 A1    Oct. 4, 2018

(51) Int. Cl.
| | |
|---|---|
| *B60W 30/095* | (2012.01) |
| *G05D 1/00* | (2006.01) |
| *B60W 50/08* | (2012.01) |
| *B60W 10/20* | (2006.01) |
| *B60W 10/04* | (2006.01) |
| *B60W 30/02* | (2012.01) |
| *B60W 50/14* | (2012.01) |

(52) U.S. Cl.
CPC ........... *G05D 1/0011* (2013.01); *B60W 10/04* (2013.01); *B60W 10/20* (2013.01); *B60W 30/02* (2013.01); *B60W 50/082* (2013.01); *B60W 50/14* (2013.01); *G05D 1/0061* (2013.01); *B60W 2050/143* (2013.01)

(58) Field of Classification Search
CPC ...... G05D 1/0011; G05D 1/0061; A01C 7/00; B60W 30/00; B60W 30/095; G01S 19/11; B60Q 9/008; G01C 21/20; B60K 31/0008
See application file for complete search history.

(56) References Cited

U.S. PATENT DOCUMENTS

| | | | |
|---|---|---|---|
| 5,548,516 A | 8/1996 | Gudat et al. | |
| 5,555,503 A * | 9/1996 | Kyrtsos | G01S 19/11 |
| | | | 342/357.24 |
| 5,612,883 A * | 3/1997 | Shaffer | B60K 31/0008 |
| | | | 340/435 |
| 6,633,800 B1 | 10/2003 | Ward et al. | |
| 7,065,440 B2 * | 6/2006 | Aral | G01C 21/20 |
| | | | 342/358 |
| 8,433,470 B1 | 4/2013 | Szybalski et al. | |

(Continued)

*Primary Examiner* — Yuri Kan
(74) *Attorney, Agent, or Firm* — Dinsmore & Shohl LLP

(57) ABSTRACT

An electronic control unit for a vehicle for switching vehicle control from an autonomous driving mode includes one or more processors, network interface hardware configured to communicate with a remote server over a network, and one or more memory modules that store logic. The electronic control unit executes logic to determine that the autonomous driving mode of the vehicle will terminate, determine that a driver is unavailable to take immediate control of the vehicle upon termination of the autonomous driving, transfer control of the vehicle to a remote operator over the network interface hardware for a first time period, generate an alert to the driver to take manual control of the vehicle, and transfer control of the vehicle to one of the driver and the autonomous driving mode after the first time period has elapsed.

17 Claims, 4 Drawing Sheets

(56) References Cited

U.S. PATENT DOCUMENTS

| | | | |
|---|---|---|---|
| 9,235,211 B2 | 1/2016 | Davidsson et al. | |
| 9,265,187 B2 * | 2/2016 | Cavender-Bares | A01C 7/00 |
| 9,342,074 B2 * | 5/2016 | Dolgov | B60W 30/00 |
| 9,494,935 B2 * | 11/2016 | Okumura | B60W 30/00 |
| 9,505,305 B2 * | 11/2016 | Tsuyunashi | B60W 30/095 |
| 9,529,361 B2 * | 12/2016 | You | G05D 1/0061 |
| 9,764,689 B2 * | 9/2017 | Burke | B60Q 9/008 |
| 2014/0207535 A1 | 7/2014 | Stefan et al. | |

\* cited by examiner

US 10,133,270 B2

ELECTRONIC CONTROL UNITS, VEHICLES, AND METHODS FOR SWITCHING VEHICLE CONTROL FROM AN AUTONOMOUS DRIVING MODE

TECHNICAL FIELD

The present specification generally relates to electronic control units, vehicles, and methods for switching vehicle control from an autonomous driving mode and, more specifically, electronic control units, vehicles and methods for switching vehicle control from an autonomous driving mode to a remote operator in response to determining that an autonomous driving mode of the vehicle will terminate.

BACKGROUND

In typical handover situation wherein a vehicle changes between autonomous driving and manual driving, the driver takes control of the autonomous vehicle. However, there may be circumstances where the vehicle cannot be operated autonomously and the driver cannot yet take control. Some solutions to this problem involve the vehicle executing a fail-safe maneuver such as pulling over or stopping, thus interrupting the vehicle's travel.

Accordingly, a need exists for alternative electronic control units, vehicles, and methods for switching vehicle control from an autonomous driving mode to a remote operator in light of a future handover situation that does not interrupt the vehicle's travel.

SUMMARY

In one embodiment, an electronic control unit for a vehicle for switching vehicle control from an autonomous driving mode may include one or more processors, network interface hardware communicatively coupled to the one or more processors and configured to communicate with a remote server over a network, and one or more memory modules communicatively coupled to the one or more processors that store logic. The electronic control unit executes logic to determine that the autonomous driving mode of the vehicle will terminate, determine that a driver is unavailable to take immediate control of the vehicle upon termination of the autonomous driving mode based on a driver condition signal output by one or more driver condition sensors, transfer control of the vehicle to a remote operator over the network interface hardware for a first time period in response to determining that the driver is unavailable to take immediate control of the vehicle upon termination of the autonomous driving mode, generate an alert to the driver to take manual control of the vehicle in response to determining that the autonomous driving mode will terminate, and transfer control of the vehicle to one of the driver and the autonomous driving mode after the first time period has elapsed.

A vehicle for switching vehicle control from an autonomous driving mode may include one or more driver condition sensors that output a driver condition signal, and an electronic control unit. The electronic control unit may include one or more processors, network interface hardware communicatively coupled to the one or more processors and configured to communicate with a remote server over a network, and one or more memory modules communicatively coupled to the one or more processors that store logic. The electronic control unit may execute logic to determine that the autonomous driving mode of the vehicle will terminate, determine that a driver is unavailable to take immediate control of the vehicle upon termination of the autonomous driving mode based on the driver condition signal output by the one or more driver condition sensors, transfer control of the vehicle to a remote operator over the network interface hardware for a first time period in response to determining that the driver is unavailable to take immediate control of the vehicle upon termination of the autonomous driving mode, generate an alert to the driver to take manual control of the vehicle in response to determining that the autonomous driving mode will terminate, and transfer control of the vehicle to at least one or the driver and the autonomous driving mode after the first time period has elapsed.

A method of switching vehicle control from an autonomous driving mode may include determining that the autonomous driving mode of the vehicle will terminate, determining that a driver is unavailable to take immediate control of the vehicle upon termination of the autonomous driving mode based on the driver condition signal output by one or more driver condition sensors, transferring control of the vehicle to a remote operator for a first time period in response to determining that the driver is unavailable to take immediate control of the vehicle upon termination of the autonomous driving mode, generating an alert to the driver to take manual control of the vehicle in response to determining that the autonomous driving mode will terminate, and transferring control of the vehicle to one of the driver and the autonomous driving mode after the first time period has elapsed.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein include electronic control units, vehicles, and methods for switching vehicle control from an autonomous driving mode. Embodiments described herein may use a variety of information (e.g., from vehicle sensors and/or over a network) to determine that an autonomous driving mode of a vehicle will come to an end. For instance, there may be some instances where an autonomous driving mode may be unsuitable in certain situations. Such situations may include upcoming traffic conditions, upcoming inclement weather, upcoming construction zones, upcoming areas where autonomous driving is prohibited, and the like. When an autonomous driving mode is predicted to come to an end, the autonomous vehicle may attempt to transfer control of the vehicle from an autonomous driving mode to the driver. Based on a variety of driver condition sensors, the electronic control unit, vehicle, and method may determine that the driver is unable to take immediate control of the vehicle. In such instances, the electronic control unit, vehicle, or method, may instead transfer control of the vehicle to a remote operator who can control the vehicle for a period of time until either the driver can take control of the vehicle or the vehicle's autonomous driving mode can be reinstated. In this way, control of the vehicle can be seamlessly transferred between an autonomous driving mode, a remote operator, and the vehicle driver without interruption of travel. The various electronic control units, vehicles, and methods for switching vehicle control from an autonomous driving mode will be described in more detail herein with specific reference to the corresponding drawings.

As used herein, the phrase "autonomous driving mode" may refer to a fully autonomous driving mode, wherein the vehicle may travel to a destination without control of a driver, or a partially autonomous driving mode, wherein the vehicle only performs certain driving maneuvers autonomously (e.g., autonomous parking and the like).

As used herein, the phase "hand-over situation" refers to a situation in which the vehicle determines that autonomous driving will come to an end and control of the vehicle will be passed either to the vehicle driver of a remote operator. Such situations include situations where it is determined that autonomous driving is not appropriate (e.g., dense traffic, construction zones, inclement weather, autonomous vehicle restricted driving zones, and the like).

Figure 1:
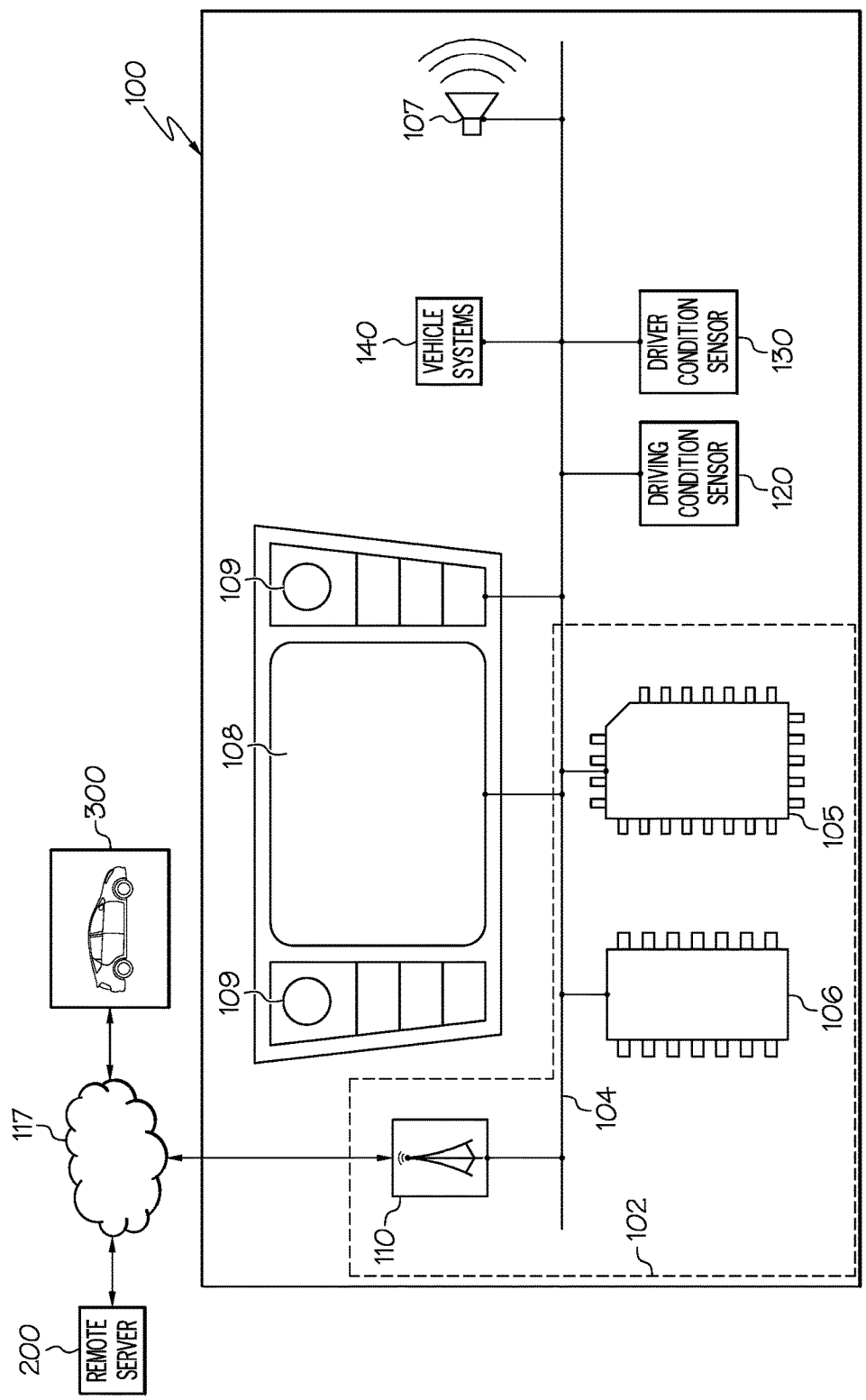
FIG. 1 depicts a schematic view of a vehicle and electronic control unit for switching vehicle control from an autonomous driving mode, according to one or more embodiments shown and described herein.

Referring now to FIG. 1, a vehicle 100 capable of switching vehicle control from an autonomous driving mode is schematically depicted. The vehicle 100 may be any passenger vehicle such as, for example, a terrestrial, aquatic, and/or airborne vehicle. The vehicle 100 may include a communication path 104, electronic control unit 102, a speaker 107, a display 108, a vehicle interface 109, one or more driving condition sensors 120, one or more driver condition sensors 130, and one or more vehicle systems 140. The electronic control unit 102 may include one or more processors 105, one or more memory modules 106, and network interface hardware 110. The electronic control unit 102 may be configured to communicate with a network 117 to communicate with a remote server 200 and/or other vehicles 300 to receive information related to upcoming hand-over situations.

Still referring to FIG. 1, the communication path 104 that provides data interconnectivity between various modules disposed within the vehicle 100. Specifically, each of the modules can operate as a node that may send and/or receive data. In some embodiments, the communication path 104 includes a conductive material that permits the transmission of electrical data signals to processors, memories, sensors, and actuators throughout the vehicle 100. In another embodiment, the communication path 104 can be a bus, such as, for example, a LIN bus, a CAN bus, a VAN bus, and the like. In further embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. Moreover, the communication path 104 may be formed from a combination of mediums capable of transmitting signals. In some embodiments, the communication path 104 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Still referring to FIG. 1, the electronic control unit 102 can be any computing device. For instance the electronic control unit 102 can be any type of vehicle-installed, handheld, desktop, or other form of single computing device, or can be composed of multiple computing devices. The electronic control unit 102 includes one or more processors 105 for controlling operations of the electronic control unit communicatively coupled with one or more memory modules 106 over the communication path of the vehicle 100. The one or more processors 105 may include any device capable of executing machine-readable instructions stored on a non-transitory computer-readable medium. Accordingly, each of the one or more processors 105 may include a controller, an integrated circuit, a microchip, a computer, and/or any other computing device.

The electronic control unit 102 further includes one or more memory modules 106 communicatively coupled to the one or more processors 105 over the communication path 104. The one or more memory modules 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the electronic control unit 102 and/or external to the electronic control unit 102. The one or more memory modules 106 may be configured to store one or more pieces of logic as described in more detail below. The embodiments described herein may utilize a distributed computing arrangement to perform any portion of the logic described herein.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor, assembly language, object-oriented programming (OOP), scripting languages, microcode, etc., that may be compiled or assembled into machine-readable instructions and stored on a machine-readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. Logic stored on the one or more memory modules 106 may include, for example, logic to permit the electronic control unit 102 to implement remote operation of the vehicle 100, as described below.

The electronic control unit 102 can be in direct or indirect communication with one or more vehicle systems 140 to control various vehicle functions. The vehicle systems 140 can include one or more vehicle interfaces 109 that can allow the driver to communicate with the electronic control unit 102 to send or receive information from the electronic control unit 102. The vehicle interfaces 109 can include, for example, one or more interactive displays, audio systems, voice recognition systems, buttons and/or dials, haptic feedback systems, or any other similar systems used for inputting or outputting information. Other vehicle systems 140 can include a propulsion system, a steering system, a stability control system, a navigation system, an energy system, and any other systems that can control various vehicle functions (such as the vehicle climate or entertainment functions, etc.). In some embodiments, the vehicle interfaces 109 can be used by the driver to issue commands to the electronic control unit 102 to affect the operation of the other vehicle systems 140.

The propulsion system can control the engine, motor, transmission, and/or other vehicle controls that are used for driving the vehicle 100. The navigation system can be used for establishing the route or directions for the vehicle 100, and can include maps and/or can connect to external or remote sources for determining an optimal route. The stability control system can activate brakes or motors to one or more of the vehicle's 100 wheels to maintain the stability of the vehicle 100, including, for example, the proper yaw of the vehicle. The energy system can control the vehicle's 100 energy usage and storage, which energy source may be in the form of gasoline, natural gas, diesel oil, batteries, fuel cells, or the like. The vehicle systems 140 can be in communication with various actuators that can be used to implement the functions controlled by a particular vehicle system 140. For example, the propulsion system can cause an actuator to move the position of a throttle plate based on the position of an accelerator pedal. In this way, the various vehicle systems 140 can control or affect the operation of the vehicle's 100 engine, motor, battery system, accelerators, brakes, steering, transmission, or other systems.

Still referring to FIG. 1, the electronic control unit 102 may further include network interface hardware 110 for communicatively coupling the electronic control unit 102 with a network 117. The network interface hardware 110 can be communicatively coupled to the communication path 104 and can be any device capable of transmitting and/or receiving data via the network 117. Accordingly, the network interface hardware 110 can include a communication transceiver for sending and/or receiving any wired or wireless communication. For example, the network interface hardware 110 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 110 includes hardware configured to operate in accordance with the Bluetooth wireless communication protocol. In another embodiment, network interface hardware 110 may include a Bluetooth send/receive module for sending and receiving Bluetooth communications to/from the one or more remote devices.

The electronic control unit 102 may communicate, through the network interface hardware 110, with a network 117 to communicatively couple the electronic control unit 102 with other vehicles 300 through vehicle-to-vehicle communication. For instance, the vehicle 100 and the other vehicle 300 may send and receive information relevant to traffic conditions, road conditions, oncoming obstacles, etc. In some embodiments, the network 117 is a personal area network that utilizes Bluetooth technology to communicatively couple the electronic control unit 102 and the one or more remote devices. In further embodiments, the network 117 may include one or more computer networks (e.g., a personal area network, a local area network, or a wide area network), cellular networks, satellite networks and/or a global positioning system and combinations thereof. Accordingly, the electronic control unit 102 can be communicatively coupled to the network 117 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The electronic control unit 102 may communicate through the network interface hardware 110, with the network 117 to communicatively couple the vehicle 100 with a remote server 200. The remote server 200 may generally include processors, memory, and chipsets for delivering resources to the vehicle 100 via the network 117. As will be described in greater detail herein, a remote operator may receive information about the vehicle 100 over the remote server 200 and may send back control inputs to the electronic control unit 102 over the network 117 to control various vehicle systems 140 of the vehicle 100 (e.g., a steering system, a propulsion system, a stability control system, a navigation system, and an energy system). In this way, control of the vehicle 100 may be passed to the remote operator when it is determined that an autonomous driving mode of the vehicle 100 will terminate.

In the embodiments described herein, the one or more memory modules 106, the one or more processors 105, and the network interface hardware 110 are integral with the electronic control unit 102. However, it is noted that the electronic control unit 102, the one or more memory modules 106, the one or more processors 105, and the network interface hardware 110 may be discrete components communicatively coupled to one another without departing from the scope of the present disclosure.

Still referring to FIG. 1, the vehicle 100 may include a display 108 for providing visual output such as, for example, maps, navigation, entertainment, information, or a combination thereof. The display 108 is coupled to the communication path 104. Accordingly, the communication path 104 communicatively couples the display 108 to other modules of the vehicle 100. The display 108 may include any medium capable of transmitting an optical output such as, for example, a cathode ray tube, light emitting diodes, a liquid crystal display, a plasma display, or the like. Moreover, the display 108 may be a touchscreen that, in addition to providing optical information, detects the presence and location of a tactile input upon a surface of or adjacent to the display 108. Accordingly, each display 108 may receive mechanical input directly upon the optical output provided by the display 108. Additionally, it is noted that the display 108 can include at least one of the one or more processors 105 and the one or more memory modules 106. In some embodiments, the vehicle 100 may include multiple displays. The display 108 may be coupled to a dashboard of the vehicle 100. However, in other embodiments, the display 108 may be positioned elsewhere in the vehicle 100. In yet further embodiments, the display 108 may be a heads-up display.

The vehicle interface 109 is schematically illustrated as being combined with the display 108. However, it is noted that the vehicle interface 109 may include a variety of user input components communicatively coupled to a variety of vehicle 100 components and is not limited to being coupled to the display 108.

The speaker 107 is coupled to the communication path 104 and communicatively coupled to the electronic control unit 102. The speaker 107 is any device capable of transforming electrical signals into audible mechanical vibrations. The speaker may output an audible warning to the driver that the autonomous driving mode of the vehicle 100 will terminate. This may alert the driver to acclimate him/herself to the current vehicle situation and prepare themselves to take control of the vehicle 100.

As noted herein, the vehicle 100 includes one or more driving condition sensors 120. The one or more driving condition sensors may be communicatively coupled to the electronic control unit over the communication path 104, such that the electronic control unit 102 can be in direct or indirect communication with the one or more driving condition sensors 120. The one or more driving condition sensors 120 may be any sensor capable of outputting a driving condition signal to the electronic control unit 102. The driving condition signal may be indicative of information relevant to both current driving conditions of the vehicle 100 and future driving conditions of the vehicle 100. For example, information received from the one or more driving condition sensors 120 may allow the electronic control unit 102 to predict upcoming driving conditions which may allow the electronic control unit 102 to predict that the autonomous driving mode of the vehicle 100 will be terminated.

The one or more driving condition sensors 120 can be used to measure movement of the vehicle 100, such as direction, speed, acceleration, yaw, etc. Based on the data received from the one or more driving condition sensors 120, the electronic control unit 102 can control the vehicle systems 140 during the autonomous driving mode to autonomously drive the vehicle 100. Example sensors 120 can include accelerometers, gyroscopes, and/or magnetometers, one or more of which can be combined in an inertial measurement unit (IMU). The one or more driving condition sensors 120 may include location sensors that can use a global positioning satellite system (GPS) to determine the vehicle's 100 location. In some embodiments, real-time traffic and route information may be received over the GPS.

In some embodiments, the one or more driving condition sensors 120 may include optical sensors such as cameras that can capture image data using charge coupled devices (CCD), complementary metal oxide semiconductors (CMOS), or similar image capturing elements, and can be configured to capture single-spectral images or multi-spectral images. In some embodiments, the one or more driving condition sensors 120 may include radar sensors and/or lidar sensors (using radio or light detection, respectively) that can help identify objects (such as other vehicles) in the vicinity of the vehicle 100. Other included as the one or more driving condition sensors 120 may be able to detect changes in the climate (e.g., thermometers or barometers) or altitude (e.g., altimeters), and can include internal sensors to monitor the statuses of the vehicle systems 140 (e.g., monitoring the fuel or energy level, engine temperature, oxygen level, tire pressure, etc.). Among other information detectable by the one or more driving condition sensors 120, the one or more driving condition sensors 120 may detect vehicle speed, vehicle direction, vehicle acceleration, vehicle rotation, vehicle location, environmental weather conditions, traffic conditions, and road conditions.

Figure 2:
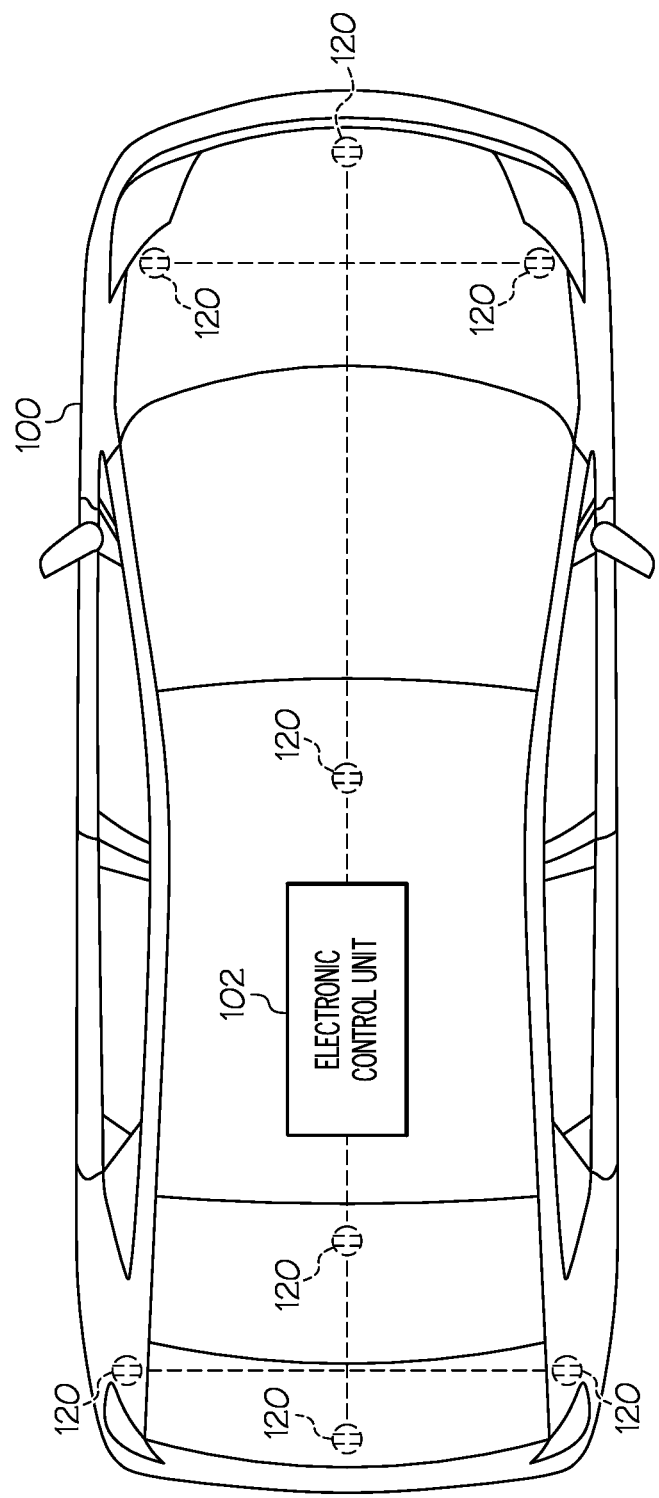
FIG. 2 depicts a top view of a vehicle and electronic control unit of FIG. 1, according to one or more embodiments shown and described herein.

Referring also to FIG. 2, FIG. 2 is a pictorial representation of the vehicle 100 in direct or indirect communication with the electronic control unit 102. The one or more driving condition sensors 120 can be disposed at various locations on the vehicle 100. The one or more driving condition sensors can be configured to capture changes in velocity, acceleration, wheel revolution speed, yaw, and distance to objects within the surrounding environment for use by the electronic control unit to estimate position and orientation of the vehicle 100 and steering angle, for example in a dead-reckoning system. The one or more driving condition sensors 120 can also capture data representative of changes in x, y, and z-axis position, velocity, acceleration, rotation angle, and rotational angular rate for the vehicle and similar data for objects proximate to the navigation route of the vehicle 100. If the one or more driving condition sensors 120 capture data for a dead-reckoning system, data relating to wheel revolution speeds, travel distance, steering angle, and steering angular rate of change can be captured.

As noted above the one or more driving condition sensors 120 may include lidar sensors that can capture data related to laser returns from physical objects in the area surrounding the vehicle 100 with ranging distances calculated by measuring the time it takes for a signal to return to the lidar sensor. Laser returns can include the backscattered light reflected by objects hit by a source of light, e.g. laser light, being emitted by the lidar sensors or another source disposed on or proximate to the vehicle 100. Once the light is reflected by an object, the lidar sensors can capture intensity values and reflectivity of each point on the object to be used for analyzing and classifying the object, for example.

The one or more driving condition sensors 120 can also be used to detect traffic signals and traffic patterns, for example by capturing images of traffic lights, markings on the road, or traffic signs. For example, optical sensors can capture images for processing by the electronic control unit 102. As an example, by using the optical sensors to read the lane markings on a road, the electronic control unit 102 can determine where the proper travel lanes are on that road (i.e., the space between two sets of lane markings). As another example, using text recognition processing, one or more optical sensors can read traffic signs that state the legal speed limit on each road. This information can be used by electronic control unit 102 when operating the vehicle in autonomous mode, as described below. In addition, the optical sensors can be configured to capture single- or multi-spectral image data of the driving environment.

As noted herein above, the one or more driving condition sensors 120 can include one or more location sensors that can capture the position of the vehicle 100 in global coordinates based on signals from a plurality of satellites. A plurality of satellites can be used to estimate the vehicle's 100 position and velocity using three-dimensional triangulation and time estimation. In addition, any other data and/or signals that could be used to determine the current and future states of the vehicle 100 or determine the position or future position of the vehicle 100 with respect to its environment can be captured by the one or more driving condition sensors 120.

In some embodiments, the driving condition signal may also be provided by communications received over the network interface hardware from a remote server 200 or other vehicles 300, for example. For example, communications received over the network interface hardware 110 may include information relevant to future driving conditions (e.g., upcoming traffic conditions, inclement weather, construction zones, areas where autonomous driving is prohibited, and the like).

As noted herein, the vehicle 100 can include options for operating in a manual driving mode or an autonomous driving mode. When the vehicle 100 is operating in the manual driving mode, the driver manually controls at least some of the various vehicle systems 140 to drive the vehicle 100. In the autonomous driving mode, on the other hand, the electronic control unit 102 is used to control at least some of the various vehicle systems 140 to drive the vehicle 100 without the driver's intervention. Some vehicles may be equipped with a "partially-autonomous driving mode," in which operation of the vehicle 100 is shared between the driver and the electronic control unit 102. For example, the driver can control certain aspects of the vehicle 100 operation, such as steering, while the electronic control unit 102 can control other aspects of the vehicle 100 operation, such as braking and acceleration. In addition to the foregoing driving modes, the vehicle 100 can operate in remote operation mode, as described in more detail below.

As noted above, it is contemplated that under normal operating circumstances, the one or more driving condition sensors 120 will provide enough information for the electronic control unit 102 to operate the vehicle 100 in the autonomous driving mode. However, the vehicle 100 may from time to time encounter driving environments, expected or unexpected, in which autonomous operation is inappropriate, for example, a construction zone, an obstruction in the middle of the road, heavy traffic, inclement weather, autonomous vehicle restricted driving zones, and the like. In addition, certain road patterns may be deemed too challenging for the autonomous driving mode, such as an intersection where there is no clear line of sight, a mountainous region with winding roads, or a dense urban environment. The electronic control unit 102 can detect that the vehicle 100 is in such a driving environment or will be in such a driving environment at some future time based on driving condition signal received from the one or more driving condition sensors 120. In some embodiments, the locations of such regions can be stored as challenging environments in map data accessible by the electronic control unit 102 (for example, stored locally in the one or more memory modules 106 or accessible from remote sources). Additionally, the existence of driving environments inappropriate for the autonomous driving mode can be determined if the environmental information (e.g., the roads, traffic signals, traffic patterns, etc.) as detected by the one or more driving condition sensors 120 differs from expected data about the environment, as retrieved from a map or database stored locally or remotely. A threshold can also be defined to allow minor variance between the captured data and the expected data, and the changes in the environment can be measured against such threshold. Any of these driving environments for which autonomous mode is ill advised can be deemed a "driving environment inappropriate for autonomous driving" for the purposes of this disclosure. For the purposes of this disclosure, a "driving environment inappropriate for autonomous driving" means any driving environment or situation which the electronic control unit 102 determines is not suitable for autonomous operation such that the autonomous driving mode will terminate.

When the vehicle 100 is operating in the autonomous driving mode, the electronic control unit 102 can analyze the driving condition signal output by the one or more driving condition sensors 120 or received from a communication over the network interface hardware 110 and based on the driving condition signal, issue relevant commands to the vehicle systems 140. For example, the electronic control unit 102 can determine the maximum speed limit on a road upon which the vehicle 100 is traveling based on the text of a traffic sign detected the one or more driving condition sensors 120. Alternatively, the electronic control unit 102 can use the location information received from the one or more driving condition sensors 120 and map data stored locally (such as in the memory 106) or retrieved from a remote source to determine the maximum speed limit. Once the electronic control unit 102 determines the maximum speed limit of the road, the electronic control unit 102 can prevent the vehicle systems 140 from operating the vehicle 100 in excess of the maximum speed limit. As another example, by detecting the lane markings, the electronic control unit 102 can ensure that the vehicle systems 140 operate the vehicle 100 within the appropriate lanes.

As noted hereinabove, the electronic control unit 102, based on information received from the one or more driving condition sensors 120 may be able to determine that an autonomous driving mode of the vehicle 100 will terminate at some future time based on an upcoming driving environment that is inappropriate for the autonomous driving mode. For example, where the one or more driving condition sensors 120 include one or more location sensors, the electronic control unit may determine that the vehicle 100 will enter a restricted autonomous vehicle driving zone. In such zones, driving the vehicle 100 in an autonomous driving mode may be prohibited. In such a case, the electronic control unit 102 would determine that the autonomous driving mode of the vehicle 100 must end and that control of the vehicle 100 must be transferred to one of the driver or a remote operator. Similarly, the electronic control unit 102, based on information received from the one or more driving condition sensors 120 or a communication received over the network interface hardware 110, may be able to determine that an autonomous driving mode of the vehicle 100 may be reinstated. For example, when the vehicle 100 leaves a restricted autonomous vehicle driving zone.

As noted above, in some embodiments, instead of, or in addition to, information received from the one or more driving condition sensors 120, the electronic control unit 102 may receive a communication over the network interface hardware 110 from other vehicles 300 or a remote server 200, indicative of an autonomous driving mode of the vehicle 100 terminating at some future time. For example, a communication received over the network interface hardware 110 may be indicative of upcoming events en route including but not limited to, restricted autonomous vehicle driving zones, traffic, inclement weather, and the like. In some embodiments, the information received from the one or more driving condition sensors 120 may be communicated with the remote server 200, which returns predicted upcoming events en route that may affect the ability of the vehicle 100 to be operated in the autonomous driving mode such that the autonomous driving mode will terminate.

The electronic control unit 102 may, in some embodiments, determine that the autonomous driving mode of the vehicle 100 will terminate based on navigation information. As noted herein, in some embodiments, the one or more driving condition sensors 120 may include one or more location sensors that use a GPS to determine the vehicle's 100 location. As such, the vehicle 100 may at times be driving on a planned or otherwise recognized route. Based on navigation data stored in the electronic control unit 102, the electronic control unit 102 may be able to determine that the autonomous driving mode of the vehicle 100 will terminate based on this navigation data. For example, where the vehicle 100 is driving along a planned route, the electronic control unit 102 may recognize that the autonomous driving mode of the vehicle 100 will end when the vehicle 100 exists on an off-ramp from a highway into a restricted autonomous driving zone.

In instances wherein it is determined that the autonomous driving mode of the vehicle 100 will terminate, control of the vehicle 100 may be transferred to one of the driver, if the driver is available, or a remote operator when the driver is unavailable. In the remote operation mode, the vehicle 100 can be remotely operated by a remote operator. In one example implementation, the driver (i.e., the occupant physically within the vehicle 100), may be determined to be unavailable to take immediate control of the vehicle 100 upon termination of the autonomous driving mode. For example, and as will be described in greater detail herein, the driver may be determined to be unavailable if the driver is asleep or distracted. In such case, the electronic control unit 102 will automatically transfer control of the vehicle 100 to the remote operator over the network interface hardware 110. When it is determined that the driver is later available to take control of the vehicle, control of the vehicle may automatically be transferred from the remote operator to the driver. In yet further embodiments, if the driver is still unavailable, but the vehicle 100 is no longer driving in a driving environment that is inappropriate for autonomous driving, control of the vehicle can be returned to the autonomous driving mode.

Referring again to FIG. 1, the vehicle 100 includes one or more driver condition sensors 130. The one or more driver condition sensors 130 may be communicatively coupled to the electronic control unit over the communication path 104, such that the electronic control unit 102 can be in direct or indirect communication with the one or more driver condition sensors 130. The one or more driver condition sensors 130 may be any sensor configured to output a driver condition signal indicative of the availableness of the driver to take control of the vehicle 100 in the event that an autonomous driving mode of the vehicle 100 terminates. For example, the one more driver condition sensors may include biologic sensors such as, for example, heart rate monitors, breathing monitors, blood pressure monitors, and the like. In some embodiments, the one or more driver condition sensors 130 may provide information that may allow the electronic control unit 102 to determine the driver is incapacitated or experiencing a medical emergency.

In some embodiments, the one or more driver condition sensors 130 may include one or more cameras to determine a position of the driver's eyes or head to determine driver awareness/availability. For example, if the driver's eyes are closed and/or or the driver's head is turned away, the electronic control unit 102 may determine that the driver is unavailable to take immediate control of the vehicle 100 upon termination of the autonomous driving mode. In some embodiments, the one or more driver condition sensors 130 may include seat position sensors. For example, if the driver's seat is reclined to a position not generally associated with driving (e.g., mostly/fully reclined), the electronic control unit may determine that the driver is unavailable to take immediate control of the vehicle upon termination of the autonomous driving mode.

In some embodiments, the one or more driver condition sensors 130 may be coupled to various driving apparatuses of the vehicle 100, such as for example, a steering wheel, a shifter, and the pedals of the vehicle. The one or more driver condition sensors 130 may output information relevant to the positions of the various driving apparatuses as manipulated by the driver. As will be explained in greater detail herein, in conditions wherein control of the vehicle 100 is transferred from the remote operator to the driver, the control inputs of the remote operator may be compared with the motions of the driver, as measured by the one or more driver condition sensors 130, to determine if the driver is available to take control of the vehicle 100. As such, there may be a threshold in which the driver must match the control inputs of the remote operator before control of the vehicle 100 can be transferred from the remote operator to the driver.

Figure 3:
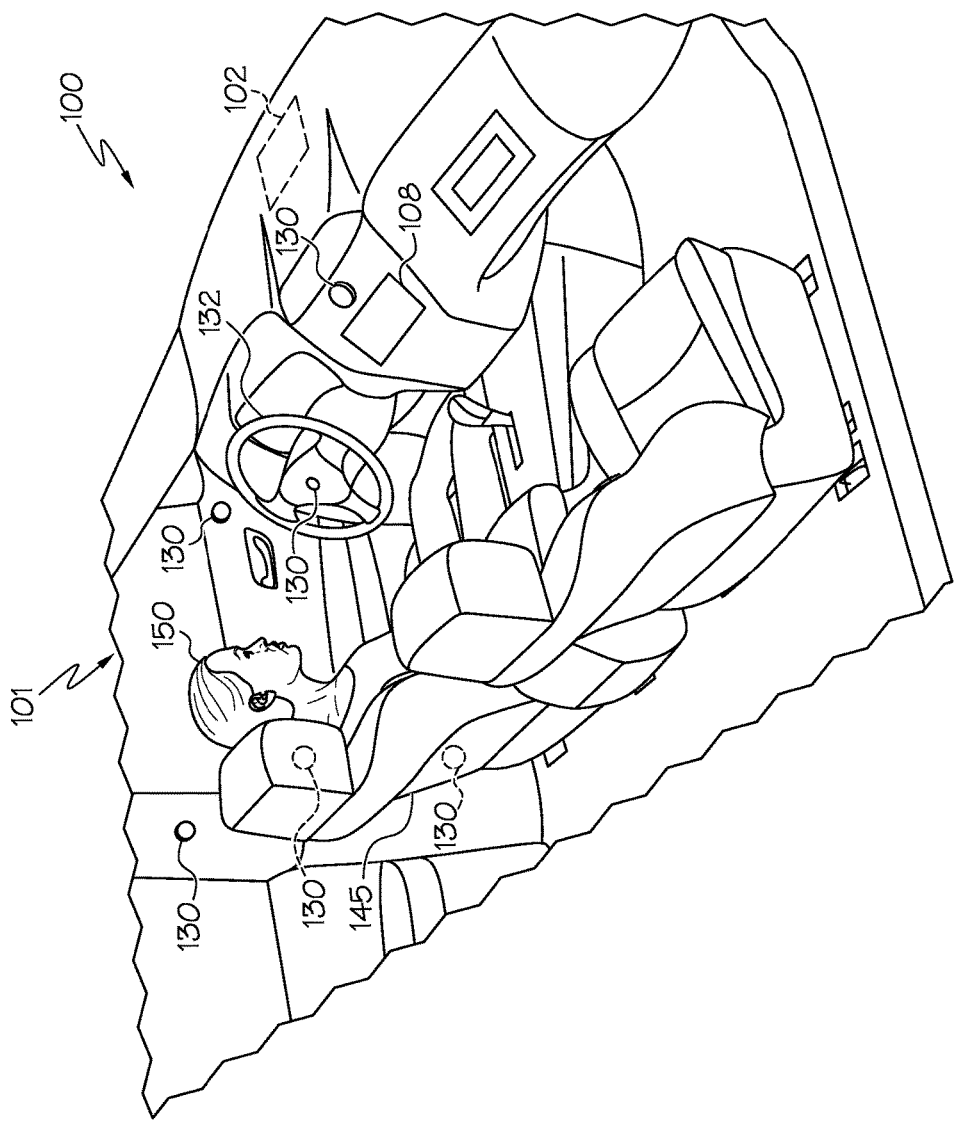
FIG. 3 depicts a passenger compartment of the vehicle of FIG. 1, according to one or more embodiments shown and described herein.

Referring to FIG. 3, a passenger cabin 101 of the vehicle 100 is illustrated with a driver 150 positioned within the driver seat 145 of the vehicle. As illustrated the one or more driver condition sensors 130 may be placed in a variety of locations throughout the passenger cabin 101. For example, when the one or more driver condition sensors 130 include various biologic sensors, the sensors may be located on or within the driver seat 145 or in places often touched by the driver 150 (e.g., the steering wheel 132). Similarly, wherein the one or more driver condition sensors 130 include seat position sensors, the seat position sensors may be located on or within the driver seat 145. When the one or more driver condition sensors 130 include one or more cameras, the one or more cameras may be positioned in a variety of locations throughout the passenger cabin 101 to collect image data of the driver 150. Such locations may include the steering wheel 132, the dashboard, the door, the interior vehicle pillars, and the like. Furthermore, as noted herein the one or more driver condition sensors 130 may be coupled to the various driving apparatuses of the vehicle 100 (e.g., the steering wheel 132, the shifter, and the pedals) to output information indicative of inputs of the driver 150 into the driving apparatuses.

Figure 4A:
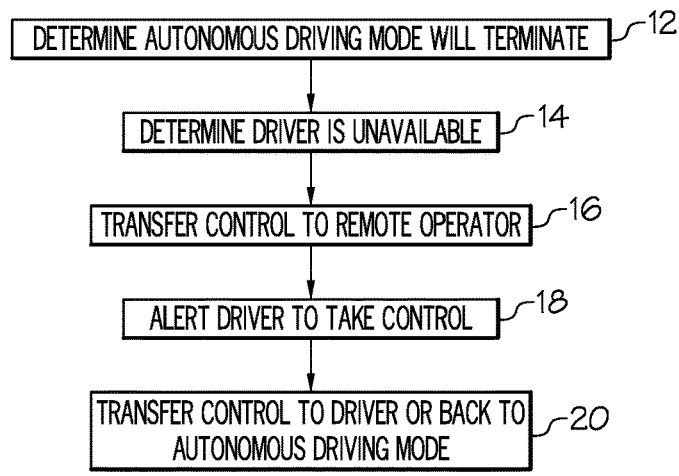
FIG. 4A depicts a method for switching vehicle control from an autonomous driving mode, according to one or more embodiments shown and described herein.

FIG. 4A illustrates one exemplary implementation of a method for transferring vehicle control from the autonomous driving mode. In this implementation, electronic control unit 102, based on a driving condition signal output by at least one of one or more driving condition sensors 120 and a communication received over the network interface hardware 110, determines whether the autonomous driving mode of the vehicle 100 will terminate (block 12). For example, the electronic control unit 102 may predict that the autonomous driving mode will come to the end where the driving condition signal indicates that the vehicle will enter a driving zone unsuitable for autonomous driving (e.g., restricted autonomous vehicle driving zone, upcoming traffic conditions, upcoming inclement weather, upcoming portions of a planned route where autonomous driving is not permitted, and the like.)

Upon determining that the autonomous driving mode will terminate (block 12), the electronic control unit 102, based on the driver condition signal output by one or more driver condition sensors 130, may determine that the driver 150 is unavailable to take immediate control of the vehicle 100 upon termination of the autonomous driving mode (block 14). For example, where the driver condition signal indicates that the driver 150 is distracted, sleeping, or otherwise unavailable, the electronic control unit 102 may determine that the driver 150 is unavailable to take immediate control of the vehicle 100 upon termination of the autonomous driving mode.

Upon determining that the driver is unavailable to take immediate control of the vehicle 100 upon termination of the autonomous driving mode (block 14), the electronic control unit 102 may transfer control of the vehicle 100 to a remote operator over the network interface hardware 110 for a first time period (block 16). As noted hereinabove, the remote operator may control the various vehicle systems 140 to control the navigation of the vehicle 100 until either the driver 150 becomes available to take control of the vehicle 100 or until the autonomous driving mode can be reinstated. For example, the remote operator may control operation of the vehicle 100 by transmitting messages or commands from the remote server 200 to the network interface hardware 110 of the electronic control unit 102 that are then used to control the various vehicle systems 140. Hence, the first time period may be any time sufficient for either the driver 150 to become available, as determined by the electronic control unit 102 based on the driver condition signal output by the one or more driver condition sensors 130, or for the autonomous driving mode of the vehicle 100 to be reinstated. For example, the first time period may be about less than 5 minutes. (e.g., 1 minute). However, it is contemplated that the first time period may be greater than 5 minutes. The electronic control unit 102 may continuously or periodically monitor the driver 150 during the first time to determine whether the driver 150 has become available based on the driver condition signal output by the one or more driver condition sensors 120.

In some embodiments, the driving condition signal output by the one or more driving condition sensors 120 can be used by the remote operator to control the vehicle 100 during remote operation. In other embodiments, however, different or additional data can be collected. For example, there may be cameras that are not needed or used for driving condition sensors 120 but that can capture image data of the surrounding environment that will be useful for the remote operator.

Figure 4B:
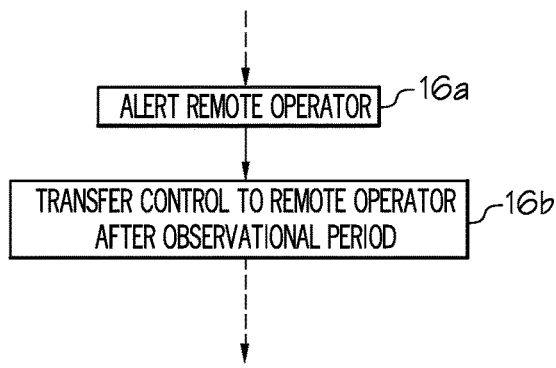
FIG. 4B depicts alternative and/or additional steps to the method of FIG. 4A, according to one or more embodiments shown and described herein.
Figure 4C:
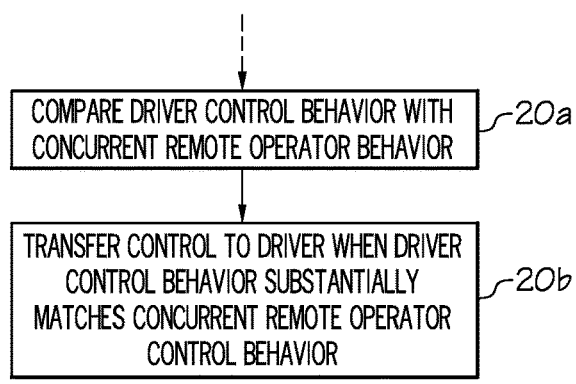
FIG. 4C depicts alternative and/or additional steps to the method of FIG. 4A, according to one or more embodiments shown and described herein.

Referring to FIG. 4B in some embodiments, the electronic control unit 102 may generate an alert to the remote operator (block 16a) over the network interface hardware 110 to take control of the vehicle 100 in response to determining that the autonomous driving mode will terminate and that the driver is unavailable to take immediate control of the vehicle upon termination of the autonomous driving mode. The electronic control unit 102 may then wait an observational period after generating the alert to the remote operator and before transferring control of the vehicle 100 to the remote operator (block 16b). Such observational period may allow the remote operator to familiarize themselves to the operating conditions and environment of the vehicle 100 prior to the remote operator taking control of the vehicle 100. The observation period could include any time period sufficient to allow the remote operator to become familiar with the operating conditions of the vehicle. For example, the observational period could be anywhere from about 15 seconds to about 1 minute (e.g., 30 seconds). As noted herein, the remote operator may observe the environment and operating conditions of the vehicle 100 through information provided by the one or more driving condition sensors or other sensors.

Referring again to FIG. 4A, the electronic control unit may generate an alert to the driver 150 to take manual control of the vehicle 100 in response to determining that the autonomous driving mode will terminate (block 18). For example, the alert may be issued to the driver 150 through any means. For example, an alert may be displayed on the display 108 to alert the driver 150 to take control of the vehicle 100. In some embodiments, an auditory alert may be generated over the speaker 107 of the vehicle 100 to alert the driver 150 to take control of the vehicle 100. Such alert may be issued before or after control of the vehicle 100 has been transferred to the remote operator. Control of the vehicle 100 may then be passed to the driver or back to the autonomous driving mode if appropriate (block 20). In some embodiments, control is only transferred to the driver 150 after the first time period has elapsed when it is determined that the driver 150 is available to take control of the vehicle 100. Control may instead be transferred to the autonomous driving mode after the first time period has elapsed when it is determined that the driver is still not available, but the driving environment is now appropriate for the autonomous driving mode.

Referring to FIG. 4B in some instances, before transferring control of the vehicle 100 from the remote operator and to the driver 150, the electronic control unit 102 may determine if the driver 150 is available to now take control of the vehicle 100. In some embodiments, the electronic control unit 102 will determine the driver 150 is now available based on the output of the one or more driver condition sensors 130 (e.g., driver is looking at road, or applied some input to the vehicle 100 through the vehicle interfaces 109 to indicate availability to take control of the vehicle 100). In some embodiments, after it has been determined that the driver 150 is available to take control of the vehicle 100, the electronic control unit 102 may wait a second observational period to allow the driver 150 to familiarize themselves with the operating conditions and environment of the vehicle 100 before control is transferred to the driver 150. It is contemplated that the second observational period may be longer than the observational period for the remote operator because the remote operator was presumably aware and the driver 150 may not have been. Hence, the second observation period may be anywhere from about 30 seconds to about 1.5 minutes or longer (e.g., 1 minute). In yet further embodiments, the electronic control unit 102, after alerting the driver 150 to take manual control of the vehicle 100, will compare the driver control behavior with concurrent remote operator control behavior (block 20a) and transfer control of the vehicle 100 to the driver when the driver control behavior substantially matches the concurrent remote operator control behavior (block 20b). For example, commands sent by the remote operator from the remote server 200 may be compared concurrently with operational inputs by the driver 150. For example, commands for steering wheel placement, braking, acceleration, and the like from the remote operator may be compared with the operation inputs for steering wheel placement, breaking, acceleration, and the like by the driver 150. When the driver control behavior substantially matches the concurrent commands from the remote operator, control of the vehicle 100 may be transferred to the driver 150. A threshold can also be defined to allow for minor variance between the driver control behavior and the remote operator control behavior (e.g., between about 90% and about 100%, such as about 95%).

As has been disclosed herein, embodiments of electronic control units, vehicles, and methods for switching vehicle control from an autonomous driving mode use a variety of information (e.g., from vehicle sensors and/or over a network) to determine that an autonomous driving mode of a vehicle will come to an end. When an autonomous driving mode is predicted to come to an end, the autonomous vehicle may attempt to transfer control of the vehicle from an autonomous driving mode to the driver. Based on a variety of driver condition sensors, the electronic control unit, vehicle, or method may determine that the driver is unable to take immediate control of the vehicle. In such instances, the electronic control unit, vehicle, and method, may instead transfer control of the vehicle to a remote operator who can control the vehicle for a period of time until either the driver can take control of the vehicle or the vehicle's autonomous driving mode can be reinstated. In this way, control of the vehicle can be seamlessly transferred between an autonomous driving mode, a remote operator, and the vehicle driver without interruption of travel. Moreover, by automatically transferring control of the vehicle to a remote operator until the driver becomes available allows a driver to ease into control of the vehicle instead and abrupt transfer of control.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An electronic control unit for a vehicle for switching vehicle control from an autonomous driving mode, the electronic control unit comprising:
   one or more processors;
   network interface hardware communicatively coupled to the one or more processors and configured to communicate with a remote server over a network; and
   one or more memory modules communicatively coupled to the one or more processors that store logic that, when executed by the one or more processors, cause the electronic control unit to:
      determine that the autonomous driving mode of the vehicle will terminate;
      determine that a driver is unavailable to take immediate control of the vehicle upon termination of the autonomous driving mode based on a driver condition signal output by one or more driver condition sensors;
      transfer control of the vehicle to a remote operator over the network interface hardware for a first time period in response to determining that the driver is unavailable to take immediate control of the vehicle upon termination of the autonomous driving mode;
      generate an alert to the driver to take manual control of the vehicle in response to determining that the autonomous driving mode will terminate;
      monitor the driver during the first time period, in response to transferring control of the vehicle to the remote operator, to determine whether the driver has become available to take control of the vehicle based on the driver condition signal output by the one or more driver condition sensors; and
      transfer control of the vehicle to one of the driver or the autonomous driving mode after the first time period has elapsed.

2. The electronic control unit of claim 1, wherein control is only transferred to the driver after the first time period has elapsed when it is determined that the driver is available.

3. The electronic control unit of claim 1, wherein control is transferred to the autonomous driving mode after the first time period has elapsed when is determined that the driver is not available.

4. The electronic control unit of claim 1, wherein:
   the electronic control unit determines that the autonomous driving mode of the vehicle will terminate based on at least one of a driving condition signal output by one or more driving condition sensors and a communication received over the network interface hardware; and
   the driving condition signal output by one of the one or more driving condition sensors and the communication received over the network interface hardware includes at least one of: upcoming traffic conditions, upcoming inclement weather, upcoming construction zones, and upcoming restricted autonomous driving zones.

5. The electronic control unit of claim 1, wherein the transfer of control of the vehicle to the remote operator grants the remote operator control over one or more vehicle systems including at least one of a steering system, a propulsion system, a stability control system, a navigation system, and an energy system.

6. The electronic control unit of claim 1, wherein, when executed by the one or more processors, the logic stored on the one or more memory modules further cause the electronic control unit to:
   generate an alert to the remote operator over the network interface hardware to take control of the vehicle in response to determining that the autonomous driving mode will terminate and that the driver is unavailable to take immediate control of the vehicle upon termination of the autonomous driving mode; and
   wait an observational period after generating the alert to the remote operator and before transferring control of the vehicle to the remote operator.

7. The electronic control unit of claim 1, wherein, when executed by the one or more processors, the logic stored on the one or more memory modules further causes the electronic control unit to:
   after alerting the driver to take manual control the vehicle in response to determining that the autonomous driving mode will terminate, compare driver control behavior with concurrent remote operator control behavior; and
   transfer control of the vehicle to the driver when the driver control behavior substantially matches the concurrent remote operator control behavior.

8. A vehicle for switching vehicle control from an autonomous driving mode, the vehicle comprising:
   one or more driver condition sensors that output a driver condition signal;

an electronic control unit comprising:
- one or more processors;
- network interface hardware communicatively coupled to the one or more processors and configured to communicate with a remote server over a network;
- one or more memory modules communicatively coupled to the one or more processors that store logic that, when executed by the one or more processors, cause the electronic control unit to:
  - determine that the autonomous driving mode of the vehicle will terminate;
  - determine that a driver is unavailable to take immediate control of the vehicle upon termination of the autonomous driving mode based on a driver condition signal output by the one or more driver condition sensors;
  - transfer control of the vehicle to a remote operator over the network interface hardware for a first time period in response to determining that the driver is unavailable to take immediate control of the vehicle upon termination of the autonomous driving mode;
  - generate an alert to the driver to take manual control of the vehicle in response to determining that the autonomous driving mode will terminate;
  - monitor the driver during the first time period, in response to transferring control of the vehicle to the remote operator, to determine whether the driver has become available to take control of the vehicle based on the driver condition signal output by the one or more driver condition sensors; and
  - transfer control of the vehicle to one of the driver or the autonomous driving mode after the first time period has elapsed.

9. The vehicle of claim 8, wherein control is only transferred to the driver after the first time period has elapsed when it is determined that the driver is available.

10. The vehicle of claim 8, wherein control is transferred to the autonomous driving mode after the first time period has elapsed when is determined that the driver is not available.

11. The vehicle of claim 8, wherein:
- the electronic control unit determines that the autonomous driving mode of the vehicle will terminate based on at least one of a driving condition signal output by the one or more driving condition sensors and a communication received over the network interface hardware; and
- the driving condition signal output by one of the one or more driving condition sensors and the communication received over the network interface hardware includes at least one of: upcoming traffic conditions, upcoming inclement weather, upcoming construction zones, and upcoming restricted autonomous driving zones.

12. The vehicle of claim 8, wherein, when executed by the one or more processors, the logic stored on the one or more memory modules further causes the electronic control unit to:
- generate an alert to the remote operator over the network interface hardware to take control of the vehicle in response to determining that the autonomous driving mode will terminate and that the driver is unavailable to take immediate control of the vehicle upon termination of the autonomous driving mode; and
- wait an observational period after generating the alert to the remote operator and before transferring control of the vehicle to the remote operator.

13. The vehicle of claim 8, wherein, when executed by the one or more processors, the logic stored on the one or more memory modules further causes the electronic control unit to:
- after alerting the driver to take manual control the vehicle in response to determining that the autonomous driving mode will terminate, compare a driver control behavior with concurrent a remote operator control behavior; and transfer control of the vehicle to the driver when the driver control behavior substantially matches concurrent remote operator control behavior.

14. A method of switching vehicle control of a vehicle from an autonomous driving mode, the method comprising:
- determining that the autonomous driving mode of the vehicle will terminate;
- determining that a driver is unavailable to take immediate control of the vehicle upon termination of the autonomous driving mode based on a driver condition signal output by one or more driver condition sensors;
- transferring control of the vehicle to a remote operator for a first time period in response to determining that the driver is unavailable to take immediate control of the vehicle upon termination of the autonomous driving mode;
- generating an alert to the driver to take manual control of the vehicle in response to determining that the autonomous driving mode will terminate;
- monitoring the driver during the first time period, in response to transferring control of the vehicle to the remote operator, to determine whether the driver has become available to take control of the vehicle based on the driver condition signal output by the one or more driver condition sensors; and
- transferring control of the vehicle to one of the driver or the autonomous driving mode after the first time period has elapsed.

15. The method of claim 14, wherein determining that the autonomous driving mode of the vehicle will terminate is based on the driving condition signal output by at least one of the one or more driving condition sensors and a communication received over network interface hardware.

16. The method of claim 14, wherein:
- control is only transferred to the driver after the first time period has elapsed when it is determined that the driver is available; and
- control is transferred to the autonomous driving mode after the first time period has elapsed when is determined that the driver is not available.

17. The method of claim 14, further comprising waiting an observational period after generating the alert to the remote operator and before transferring control of the vehicle to the remote operator.

* * * * *